(12) United States Patent
Gittere et al.

(10) Patent No.: US 10,093,076 B2
(45) Date of Patent: Oct. 9, 2018

(54) MULTILAYER FILM

(71) Applicants: Daniel J. Gittere, Wellington, FL (US); Tracy R. George, North Java, NY (US)

(72) Inventors: Daniel J. Gittere, Wellington, FL (US); Tracy R. George, North Java, NY (US)

(*) Notice: Subject to any disclaimer, the term of this patent is extended or adjusted under 35 U.S.C. 154(b) by 147 days.

(21) Appl. No.: 15/217,636

(22) Filed: Jul. 22, 2016

(65) Prior Publication Data

US 2017/0021592 A1    Jan. 26, 2017

Related U.S. Application Data

(60) Provisional application No. 62/195,911, filed on Jul. 23, 2015.

(51) Int. Cl.

| | |
|---|---|
| *B32B 7/12* | (2006.01) |
| *B32B 27/08* | (2006.01) |
| *B32B 27/30* | (2006.01) |
| *B32B 27/32* | (2006.01) |
| *B32B 27/36* | (2006.01) |
| *B32B 37/12* | (2006.01) |
| *B41M 7/00* | (2006.01) |

(52) U.S. Cl.
CPC ............ *B32B 7/12* (2013.01); *B32B 27/08* (2013.01); *B32B 27/30* (2013.01); *B32B 27/304* (2013.01); *B32B 27/308* (2013.01); *B32B 27/322* (2013.01); *B32B 27/36* (2013.01); *B32B 37/12* (2013.01); *B41M 7/0027* (2013.01); *B32B 2250/24* (2013.01); *B32B 2307/412* (2013.01); *B32B 2307/414* (2013.01); *B32B 2307/546* (2013.01); *B32B 2307/584* (2013.01); *B32B 2307/71* (2013.01); *B32B 2307/712* (2013.01); *B32B 2307/714* (2013.01); *B32B 2307/75* (2013.01); *B32B 2405/00* (2013.01); *B32B 2451/00* (2013.01); *B32B 2571/00* (2013.01)

(58) Field of Classification Search
USPC ....... 156/71, 247, 277; 428/40.1, 41.7, 41.8, 428/42.1, 195.1, 214, 343, 352
See application file for complete search history.

(56) References Cited

U.S. PATENT DOCUMENTS

| | | | | |
|---|---|---|---|---|
| 6,001,482 A | * | 12/1999 | Anderson | B41M 5/506 428/32.1 |
| 2002/0150734 A1 | * | 10/2002 | Snow | B32B 27/30 428/195.1 |
| 2011/0020620 A1 | * | 1/2011 | Fujii | B44C 1/1708 428/202 |
| 2014/0050901 A1 | * | 2/2014 | Adams | B64D 45/00 428/196 |

FOREIGN PATENT DOCUMENTS

EP       1354639 A1 * 10/2003  ............... B05D 1/32

* cited by examiner

*Primary Examiner* — Sing P Chan
(74) *Attorney, Agent, or Firm* — Del Vecchio and Stadler LLP

(57) ABSTRACT

A multilayer film, method of making a multilayer film, and method of applying the multilayer film to objects, wherein the multilayer film is comprised of a first adhesive layer; a flexible printable vinyl layer; an ink layer; a second adhesive layer; and a translucent polyvinyl fluoride film layer, and wherein the multilayer film has anti-graffiti, chemical resistant, and adhesive resistant capable of withstanding impairments.

20 Claims, 2 Drawing Sheets

MULTILAYER FILM

CROSS-REFERENCE TO RELATED APPLICATIONS

This application claims the benefit of, and incorporates by reference, U.S. Provisional Application No. 62/195,911, filed Jul. 23, 2015.

FIELD OF INVENTION

This invention is directed to a multilayer film for use in covering objects and protecting the objects from impairments, a method of assembling the multilayer film, and a method for applying the multilayer film to objects.

BACKGROUND OF INVENTION

While graffiti can be a form of art, graffiti is often unwanted, and includes tagging and other methods of marking an object with acid, markers, paints, stickers, and other items. As such, cities are in a constant battle with graffiti. In fact, many cities have very large budgets dedicated solely to removing graffiti. Objects around cities, public parking lots, private parking lots, and roadways are prime targets for graffiti. Graffiti is found on city walls, dumpsters, garbage cans, municipal vehicles including garbage trucks, parked train cars, busses, municipal transportation vehicles, weather shelters, traffic cabinets, utility cabinets, light poles, light control cabinets, connection boxes, electrical boxes, parking meters, bus shelters, cable access boxes, railroad electrical and control boxes, other objects that protect city infrastructure, and other city-owned objects.

In response to graffiti on objects, a city, municipality, or private owner may choose to do nothing, allowing the object to stay defaced, or they may choose to remove the graffiti. Currently, in order to remove graffiti, the owner of the object must send out a crew to clean and remove or paint over the graffiti. This process usually involves using harsh chemicals or natural based cleaners, usually resulting in noticeable damage to the object or possible fading of the original color of the object or an unsuccessful full graffiti removal, thereby causing color match issues and further visual eyesores. If there are electronics inside the object, use of a harsh chemical may cause damage to the electronic components or may be a fire hazard to the electronic components. Moreover, these chemicals are often flammable and are hazardous to humans. Overall, this process often requires the crew to spend several hours to complete.

As can be imagined, once the graffiti is removed from the object, it is still exposed to possible vandalism in the form of additional graffiti.

An alternative response to the graffiti problem is to beautify an object before graffiti can be applied or be reapplied. This beautification can be in the form of artwork such as a painted mural applied to the object. Additionally, objects may be beautified by placing advertisements thereon or blending the objects into nature by way of a placing a bush or a tree graphic on the object. Because the object is beautified in advance, it reduces, but does not eliminate, the likelihood that the object will have graffiti applied.

In addition to combatting unsightly graffiti, cities are generally looking for ways to beautify their city in order to increase the living standard for residents and to attract more people to their city. As a result, cities are paying attention to their surroundings and embracing the arts and city beautification movement. Many cities are involving local artists and businesses to come up with ideas to make their city a better place to live.

In every city, utility boxes are necessary for purposes of safely storing electrical wiring and electronic devices necessary to power and run different parts of the city or neighborhood. In some cases, the utility boxes store other wiring, including, cable wiring and telephone wiring.

The boxes are small (around 20") all the way up to large fixtures (up to 8' tall) and often placed out in the open. Because the city or utility companies do not want the contents of the utility boxes tampered with, the utility boxes are typically made of sheets of metal and include a lock. The result is typically an unsightly box in the middle of an otherwise attractive street.

Starting in the 1960s, many communities contemplated different methods for making the boxes and other municipal objects more attractive.

One such method includes establishing a beautification program and hiring an artist to paint the objects. The object will typically look good for a few years, but after some time, the paint starts to flake or discolor. The paint also offers no or very little resistance or clean ability if someone defaces the object. Painting also can harm items, such as traffic cabinets, by sealing access doors shut, sealing locks, or interfering with ventilation systems that are built into the cabinets.

Another method for making objects more attractive includes placing graphical products (such as graphical decals or graphical wraps) on the object. The graphical product is typically made of vinyl and has artwork on it. It is applied to the object, providing the object with a more pleasant artistic appearance.

The typical graphical products that are placed on the object are not intended to protect the object against graffiti and the graphical products are not made specifically for this use. Rather, the commercially available signs and films are typically made to be applied to a sign or an automobile for advertising, design, styling, or color change purposes and are incapable of protecting against graffiti.

As a result, the graphical products fail for a variety of reasons including, improper installation of the film, poor printing techniques, cheap or incorrect materials being used, and discoloration or damage of the graphical product when graffiti is removed. Discoloration may arise because the cleaner damaged the film, or the item used to deface the object (paint, marker, adhesive stickers, acid etching et cetera) never fully came off after cleaning.

As can be imagined, after time, various impairments would cause the graphical products to peel off of the utility box. The impairments include, but are not limited to, inclement weather, environmental variables such as dust, vandalism, impurities, heat, ultra violet radiation, moss, mold, corrosion, and general wear.

Moreover, the graphical product covered utility boxes may still be a target for graffiti artists. If the graphical product becomes covered by graffiti, then the result would be even more unsightly than the utility box on its own.

The current method for making a graphical product, such as a graphical wrap or film, includes the steps of selecting a printable flexible material typically made out of vinyl and having a pressure sensitive adhesive thereon. Depending on the requirements of the graphical product, the printable flexible material can be high or a low quality. The material can be more flexible and also have different adhesive properties such as removable, permanent, or temporary and also can be more aggressive and less aggressive from an adhesion standpoint. The next step is to design the image or use local photography and scan the artist's work, create the image on a computer, wherein the image on the computer is suitable for a wide grand format printer. Next the image from the computer is transferred onto the material by way of a wide-format printer, silk screen, or other methods of transferring the design onto the vinyl material. The inks may be high quality inks or low quality. The next step is to optionally apply a pressure sensitive clear laminate on the vinyl material. This is done by a lamination machine, a cold laminator, or a heat assist laminator that is automatic or hand powered, that applies the pressure sensitive laminate onto the vinyl material. Alternatively, a liquid is applied to the vinyl material, which creates a protective laminate upon drying. Also alternatively, a liquid laminate that is applied automatically or hand applied by a pressurized device (such as a spray can). This method is less effective than the pressure sensitive laminate.

The pressure sensitive laminate (or overlaminate) typically provides a finish (matte, semi-gloss, satin, or gloss) overlaminate film and the liquid laminates protect the graphics from abrasion, some chemicals, and UV exposure. It also typically protects the vinyl material and image thereon from ultraviolet rays, water, and some chemicals. The pressure sensitive laminate can be selected from a range of high to low quality, which may have a short outdoor durability of three to five years in a normal use situation, but is reduced when used in these certain applications to about one to two years depending on the climate zone and may have limited or no warranty on horizontal surfaces. The resulting processed graphical product (decal or film) is applied or installed onto the surface of an object. The surface of the object can be flat, have curves, or have angles.

In many cases, the application or installation of the processed graphical product isn't performed properly. In this case, the object isn't adequately protected and the beautification objective isn't reached and the processed graphical product may fail over time.

While there are some overlaminates and clear laminates that offer better protection and may be used as anti-graffiti, these and the typical processed graphical products are not recommended to place over the complex curves (90 degree angles, rivets, bends, et cetera) of city objects because they are thicker (2.5 mm-10 mm) or not conforming or use complex curves/simple curves and will have visual failures. These processed graphical films are traditionally used for a flat surface such as a sign. There are anti graffiti films available to place over the processed graphical products, but most have a limited life of one to three years outdoors, the film can be less effective after multiple cleanings from graffiti cleaners, still have a staining after certain types of graffiti or may be damaged when typical chemical based cleaners are used on its surface, have poor UV protection, are damaged by heat (130+/−F degrees), or are not made for this type of use and are unable to withstand environments, weather, and salt.

Thus, there is a need to provide a protective multilayer film that can withstand the above-mentioned impairments. In particular, it is desirable that the multilayer film is capable of withstanding these impairments for at least five years while protecting objects such as traffic and utility cabinets.

SUMMARY OF THE INVENTION

Accordingly, it is the subject of this invention to provide a multilayer film, method of making the multilayer film, and method of applying the multilayer film to objects, wherein the multilayer film is capable of withstanding fading for at least five and is capable of withstanding other impairments for at least seven years.

DETAILED DESCRIPTION OF THE INVENTION

The term "anti-graffiti" as used herein and in the appended claims means that graffiti can be removed effortlessly without damaging or staining while utilizing common natural or chemical based graffiti cleaners, moreover, dirt and dust and rainfall can be easily cleaned off. "Extreme weather resistant" means able to withstand temperatures in the range of −75 F degrees to +225 F degrees. "Ultraviolet radiation resistant" means able to withstand exposure to ultraviolet radiation without fading and includes "fade resistant" means absorption of more than 95% of ultra violet rays and is capable of absorbing more than 50% ultra violet radiation after 5 years, in particular, 6-8% ultra violet absorption losses per year. "Salt resistant" means able to withstand exposure to salt without corroding or discoloring. "Chemical resistant" means able to withstand exposure to chemicals without corroding, discoloring, or effecting the performance. "Acid etching resistant" means able to withstand exposure to acid etching without deterioration and changing the visual appearance. "Adhesive resistant" means that impairments such as stickers can be removed without causing damage, in particular, impairments such as stickers can be removed after they have been sitting on the surface for some time. "Conformable" means having the ability to be applied and formed on objects (through installation techniques using tools and heat) over a surface with curves, angles, compound curves, complex curves, circular raised objects, raised surfaces, concave curves, slight curves, corrugated surfaces, set around rivets, and flat surfaces without film distortion and protection loss. From a technical standpoint, a multilayer film that is conformable has technical specifications of film elasticity/elongation between 90-250% of its original structure and conformability around an object with X, Y, Z axis (3 dimensional). "Non-interfering" means that it will not effect the operations of electrical devices.

Figure 1:
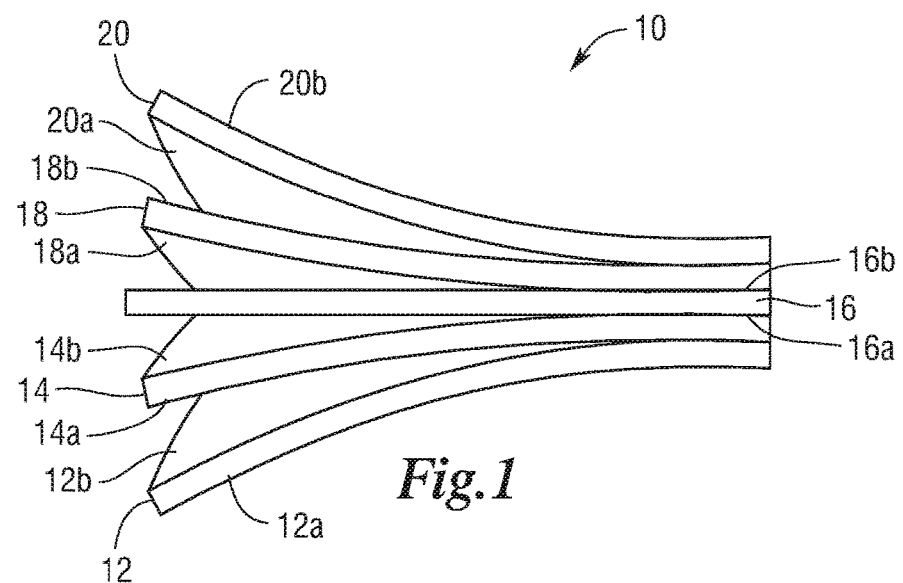
FIG. 1 depicts a cross-section side view of a multilayer film.
Figure 2:
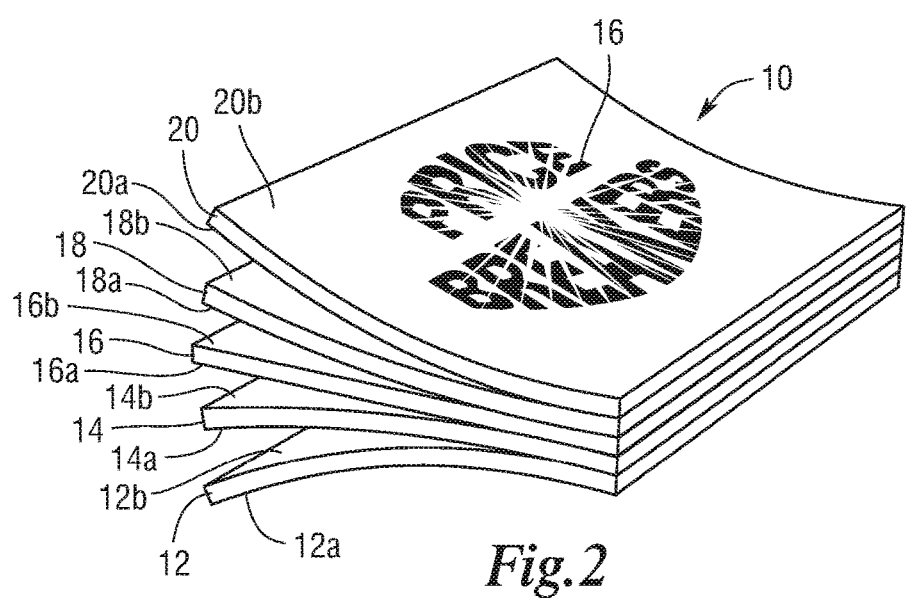
FIG. 2 depicts a perspective view of a multilayer film.

As shown in FIGS. 1 and 2, a multilayer film 10 that is easily removable after being subjected to the elements or after a period of time, wherein the multilayer film 10 is useful for extending the lifetime of printed indicia and includes a first adhesive layer 12 having opposed first and second adhesive layer surfaces 12a and 12b, a flexible printable vinyl layer 14 having opposed first and second printable vinyl layer surfaces 14a and 14b, wherein the first flexible printable vinyl surface 14a abuts and is adhered to the second adhesive layer surface 12b, an ink layer 16 having opposed first and second ink layer surfaces 16a and 16b, wherein the first ink layer surface 16a abuts and is supported by the second flexible printable vinyl layer surface 14b, a second adhesive layer 18 having opposed first and second adhesive layer surfaces 18a and 18b, wherein the first adhesive layer surface 18a of the second adhesive layer 18 abuts and is disposed on the second ink layer surface 16b, and a translucent polyvinyl fluoride film layer 20 having opposed first and second translucent polyvinyl fluoride film layer sides 20*a* and 20*b*, wherein the first translucent polyvinyl fluoride film layer side 20*a* abuts and is adhered to the second adhesive layer surface 18*b* of the second adhesive layer 18.

In another embodiment, the translucent polyvinyl fluoride film layer may be a translucent polyester film layer, a translucent extruded polyester film layer, a translucent polymer film layer, a translucent polychlorotrifluoroethylene film layer, a translucent polyvinyl fluoride film layer, a translucent fluoride resin film layer, or a translucent fluoropolymer film layer.

In one embodiment, the multilayer film is comprised of at least five separate layers, wherein the layers comprise:
 (a) a first adhesive layer;
 (b) a flexible printable vinyl layer;
 (c) an ink layer;
 (d) a second adhesive layer; and
 (e) a translucent polyvinyl fluoride film layer.

Optionally, a laminate layer may be included between the ink layer (c) and the translucent polyvinyl fluoride film (d). This provides an additional protectant layer.

First Adhesive Layer and Flexible Printable Vinyl Layer

Figure 3:
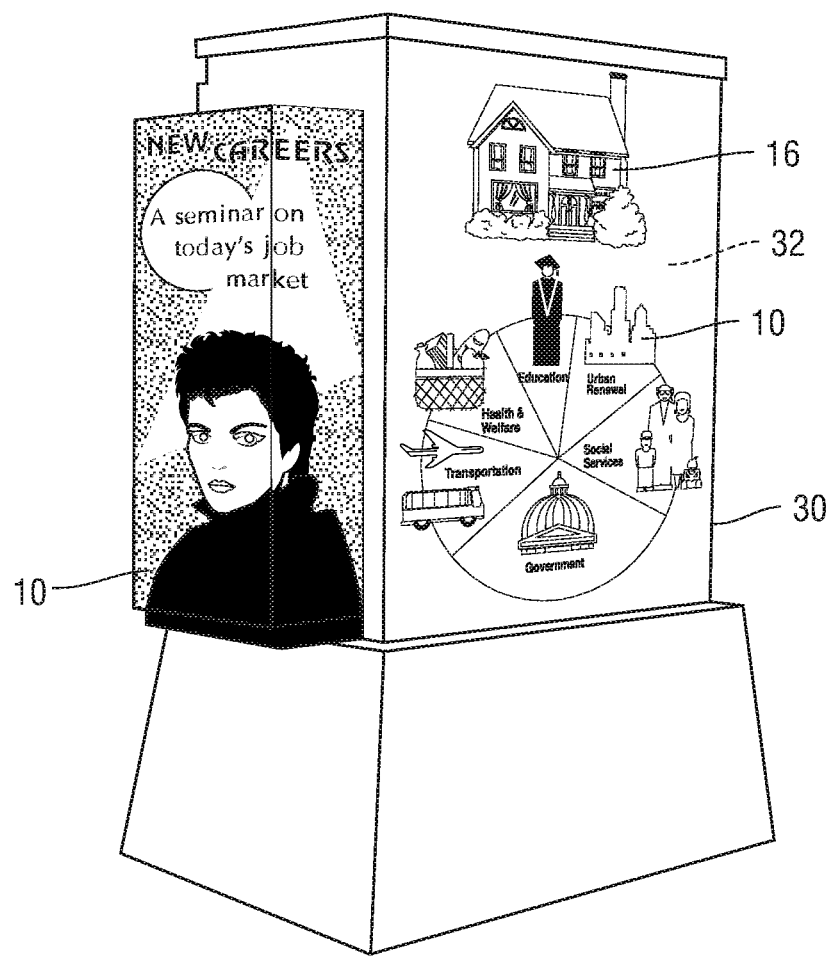
FIG. 3. depicts an object protected by a multilayer film.

In a preferred embodiment, the first adhesive layer 10 is optically clear, semi-permanent, and is a pressure-sensitive layer similar to double-sided tape. The first adhesive layer 10 may be wet or may be applied to the protective layer. In one embodiment, the adhesive layer is 54" wide (or wider or narrower as required for different applications). The first adhesive layer 10 attaches the other layers to the surface (not shown, but indicated by reference number 32 in dashed lines in FIG. 3) of the object 30 (see FIG. 3) that is being protected. Commercially, the first adhesive layer 10 is pre-applied to the flexible printable vinyl layer 12 and the combination is sold together and is known in the industry as printable wrap film. The printable wrap films may be removable or permanent. Printable wrap films and the manufacture of printable wrap films are well known to those having ordinary skill in the art and are commercially available from many manufacturers and suppliers, including: 3M® based in Maplewood, Minn., MacTAC® based in Stow, Ohio, Avery® based in Painesville, Ohio, and Orajet® based in Black Creek, Ga. Thus, printable wrap films are not described in greater detail herein.

Selection of the printable wrap film is based on several factors, including, but not limited to: how many curves the surface of an object has that the multilayer film 10 is being applied to, whether the surface 32 of the object 30 is smooth or rough, and the geographic location of the object that is being covered. If the surface 32 of object 30 is flat, then a non conformable printable wrap film is selected. However, if the surface 32 of object 30 has a lot of curves, then a conformable printable film wrap is selected. Additionally, a thinner and more flexible printable wrap film is selected for uses on electrical and traffic cabinets so that the performance of the cabinets would not be effected.

Several examples of preferred printable film wraps for different applications are listed below. All of the printable film wraps have a pressure-activated removable or permanent adhesive.

For applications requiring a multilayer film 10 that is conformable for use in traffic applications, one preferred printable film wrap is 3M® Controltac® Graphic Film with Comply® v3 Adhesive IJ180Cv3. This printable film wrap is versatile, conformable, high quality, has excellent printability, and gray pigment block resulting in perfect looking graphics. Gray pigment block is used to stop any items from showing through the film after it is applied.

For applications requiring conformability and involving a wall or textured flat surface, 3M® Envision® Print Wrap FilmSV480Cv3 or 3M® Envision® Print Wrap FilmLX480Cv3 are preferred printable film wraps.

For applications on flat walls, requiring less conformability, two options for the printable film wrap are 3M® Scotchcal® Graphic Film with Comply® Adhesive IJ35C and 3M® Scotchcal® Graphic Film with Comply® Adhesive IJ40C Essentially, any printable film wraps may be used as long as the printable film wrap is high quality, has a five to twelve year durability, accepts high resolution imagery for digital printing, is suitably heat sensitivity, and has a pressure-sensitive removable adhesive.

Ink Layer

In a preferred embodiment, the ink layer 16 is an original equipment manufacturer (OEM) layer that includes a graphic. Alternatively, the ink layer 16 may be an off brand or otherwise not an OEM ink layer 16. The ink layer 16 is applied using different types of inks or different types of digital and non-digital transfer methods such as: screen printing, Aqueous Inkjet Printing, Latex ink printing, Solvent Inkjet Printing, eco-solvent Inkjet Printing, thermal transfer printing, UV-based Printing. The ink layer 16 is preferably either cured on top of layer 14*b* or absorbs into layer 14*b*.

In another embodiment, individual designs can be created by way of the ink layer 16. In this way, each object 30 that is covered with a multilayer film 10 can be specifically designed or can be part of a cohesive design that is the same for all of the objects 30 in a certain region.

The combination of the printable wrap film and the ink layer is called a printed wrap film.

Second Adhesive Layer and Translucent Polyvinyl Fluoride Film Layer

The combination of the second adhesive layer 18 translucent polyvinyl fluoride film 20 is called the protective layer.

In one embodiment of the present invention, the second adhesive layer 18 is optically clear, acrylic-based, permanent, and pressure-sensitive. In a second embodiment, the second adhesive layer 18 is optically clear, permanent, and heat-activated.

In another embodiment, the second adhesive layer 18 is 0.7 to 1.0 mm in thickness for graphics and 1.0-1.3 mm in thickness for applications with a semi-smooth surface such as a printed stop sign.

Preferably, the second adhesive layer 18 should meet or exceed the following requirements: PSTC-1 or ASTM D3330 standards; keep its integrity for ten-twelve years; be optically clear; and be cold laminate and heat assist compatible.

Preferably, the translucent polyvinyl fluoride film layer 20 protects the ink layer 16 from ultraviolet rays, harsh chemicals, chemical etching, acid etching, weathering, and graffiti. This layer also does not promote the growth of mold, mildew, or any other organic growth. In another embodiment, the protective layer provides enhanced ultraviolet ray protection that prevents fading of the ink layer 16. In one embodiment, the translucent polyvinyl fluoride film layer 20 is adhesive resistant (adhesive resistant is understood to mean that the layer is capable of easy removal of stickers or items placed on the layer with adhesive). The translucent polyvinyl fluoride layer 20 is adhesive resistant when the adhesive has been left on the film layer for an extended period of time. In another embodiment, the translucent polyvinyl fluoride film layer 20 is not adhesive resistant.

In another preferred embodiment, the translucent polyvinyl fluoride layer 20 is Tedlar®, which is commercially available from Dupont®. Tedlar® is a clear or pigmented, stick or non-stick, polyvinyl fluoride film, which provides resistance to harsh environments and is capable of being processed under high temperature and high pressure.

In another preferred embodiment, the translucent polyvinyl fluoride layer 20 is treated on at least one side so that the translucent polyvinyl fluoride layer 20 adheres to the second adhesive layer 18. The treatment is done by oxidizing the translucent polyvinyl fluoride layer 20 with a propane flame. Without treatment, the translucent polyvinyl fluoride layer 20 is non-stick. The translucent polyvinyl fluoride layer 20 may be single-side treated or double-side treated.

In another preferred embodiment, the translucent polyvinyl fluoride layer 20 is single-side treated meaning that only one side can accept an adhesive. The second adhesive layer 18 is placed on the adhesive accepting side of the translucent polyvinyl fluoride layer 20a creating the protective layer. The first adhesive surface 18a of the protective layer is adhered to the printed film wrap combination, thereby creating the multilayer film 10. This embodiment provides for a multilayer film 10 having adhesive resistance because the exposed side 20b of the translucent polyvinyl fluoride layer 20 will not accept an adhesive and will slowly repel anything that is placed on the non-treated side 20b.

In another preferred embodiment, the translucent polyvinyl fluoride layer 20 is double sided treated meaning it can accept adhesives on any side. The second adhesive layer 18 is placed on either side 20a or 20b of the translucent polyvinyl fluoride layer 20 creating the protective layer. The first adhesive surface 18a of the protective layer is adhered to the printed film wrap combination, thereby creating the multilayer film 10. This embodiment does not provide for a multilayer film 10 having adhesive resistance.

In another preferred embodiment, a liner (not shown) is added to the first adhesive surface 18a of the protective layer so that the protective layer can be rolled and stored. When the protective layer is ready to be used, a machine removes the liner as it applies the protective layer to the printed wrap film.

In a preferred embodiment the multilayer film 10 is capable of withstanding impairments such as inclement weather, environmental variables such as dust, vandalism, graffiti, general wear, acid etching, growth of organic plants, and can withstand multiple cleanings using natural or organic and non-organic based chemicals typically used to clean graffiti.

In another preferred embodiment, the use of a natural cleaner made from orange peel extract or a soy-based cleaner both of which biodegrade after use, will safely remove harsh graffiti including epoxy paints, bingo markers, felt tip markers and other such tough inks or stains from the multilayer film 10. Other known traditional graffiti cleaning chemicals will also remove stains on the multilayer film. These chemicals include, but are not limited to, 30% sulfuric acid, 20% hydrochloric acid, 10% nitric acid, methyl ethyl ketone, gasoline, toluene, acetone, glacial acetic acid, 10% citric acid, ethylene glycol, ethyl alcohol, soy based cleaners, isopropyl alcohol, muriatic acid, paint thinner, mineral spirits, et cetera. In some cases, a simple mild detergent can be used.

In another embodiment, impairments such as stickers can be easily removed from the multilayer film 10 without causing damage, and any remaining residue can be wiped off with a natural cleaner or traditional adhesive removers.

In another embodiment the multilayer film 10 is flexible such that it can be applied to existing structures on-site or installed directly onto a new object at a manufacturer's facility.

Many protectant laminates claiming anti-graffiti and chemical resistance properties were tested, but are less preferred than the translucent polyvinyl fluoride layer 20/Tedlar® layer. Translucent polyvinyl fluoride layers 20 that are less preferred include: Avery® DOL 6060; Seal® Print Shield Anti-Graffiti Overlaminate; Vandal Guard Laminate; 3M® 1170; 3M® 1150; 3M® 8991 Surface Protection; Honeywell® HydroBlock® AG2500; and others.

Avery® DOL 6060 is less preferred because it can only be applied to simple curves, is only rated for three years outdoors and typical graffiti cleaners like methyl ethyl ketone ("MEK") discolored and deformed the material. This layer also did not meet the requirements of being adhesive resistant.

Seal® Print Shield Anti-Graffiti Overlaminate is less preferred because it is not adhesive resistant and can only be applied on simple curves.

Vandal Guard Laminate is less preferred because it can only be applied to simple curves and is only rated for three years outdoors. It also was not adhesive resistant and has an ultra violet absorption capability that is lower than preferred.

3M® 8991 Surface Protection and 3M®8993 Surface Protection are less preferred because it can only be applied to simple curves or to flat surfaces (this film is 4 mm thick), is only rated for one to two years outdoors and typical graffiti cleaners such as MEK discolored and deformed the material. It also was not adhesive resistant.

3M® ElectroCut® Film Series 1170c is less preferred because it can only be applied to simple curves or to flat surfaces. It is not recommended for graphical overlaminate applications and typical graffiti cleaners like MEK discolored and deformed the material. It also was not adhesive resistant.

3M® Anti-Graffiti Film is less preferred because it can only be applied to simple curves or to flat surfaces and windows. It is not recommended for graphical overlaminate applications and typical graffiti cleaners like MEK discolored and deformed the material. It also was not adhesive resistant. Long term use, long term UV ratings were not available or verified.

3M® Premium Protective Overlay Film with Premask 1160 is less preferred because it can only be applied to simple curves or to flat surfaces such as signs, it is not recommended for graphical overlaminate applications. Although typical graffiti cleaners such as MEK did not discolor and deform the material, it could be damaged easily by scratching it with a fingernail making it not durable and not suitable. Moreover, the long term UV ratings were not available or verified.

3M® Protective Overlay Film Series 1150 is less preferred because it can only be applied to simple curves or to flat surfaces, it cannot withstand repeated cleanings, and typical graffiti cleaners such as MEK discolored and deformed the material over time. It also was not adhesive resistant. Long term UV ratings were not available or verified.

Honeywell® HydroBlock® AG2500 or other polychloro-trifluoroethylene (PCTFE) technology is less preferred because it is only listed for applications of flat surfaces. It can be conformable with certain heat points in testing. Conformability difficult to obtain because the film is thicker (between 2 mm-3 mm). Although the technology resists most chemicals and adhesives, it is sensitive to heat especially an open flame such as a lighter, and the ultra violet absorption is less then desirable. It's less reliable because the ultra violet absorption is not in the film, rather it's in the adhesive. The high gloss tendency of this film is also less desirable because of reflection and glare. The film's ability to perform in higher temperatures and weather (like California and Arizona) make it less desirable because of performance issues.

The below are additional alternative protective laminates that were tested, but are less preferred because they are not resistant to typical graffiti cleaners and some of the cleaners such as MEK actually dissolved the protectant film. The films were also not adhesive resistant and typical types of graffiti stained the film itself. Thus, these protective laminates are less preferred for anti-graffiti protection. The films include: 3M® 8508 overlaminate film; BriteLine® Shield UV film; 3M® 8914 overlaminate film (this material also has a limited life expectancy in outdoor environments); 3M® 8519 overlaminate film; 3M® 8518 overlaminate film; 3M® 8509 overlaminate film; GF Automark Concept® 231 overlaminate film; GF Concept® 100 overlaminate film; 3M® 8520 overlaminate film; 3M® 8548G; 3M® 85491; Oracle 240; Oracle 5095; Oraguard® 240; and Oraguard® 372. Finally Avery® DOL 1060, 1080, 1560, 1360, 1370 films are all less preferred for the same reasons as noted above.

In another embodiment, a method of assembling the multilayer film includes the steps of:

Applying an ink layer 16 to a combination first adhesive layer 10 and flexible printable vinyl layer 12, wherein the ink layer 16 is applied onto the flexible printable vinyl layer 14 and the first adhesive layer 10 is below the flexible printable vinyl layer 14; applying a second adhesive layer 18 onto a translucent polyvinyl fluoride film layer 20; combining the first adhesive layer 10, flexible printable vinyl layer 12, ink layer 14, and the second adhesive layer 18 and translucent polyvinyl fluoride layer 20, and cold or heat laminating the above layers together to create a multilayer film 10.

In another embodiment, a method of assembling the multilayer film 10 includes the steps of: selecting an appropriate base layer comprised of a first adhesive layer 10 and a flexible printable vinyl layer 12 and a temporary paper liner (not shown) on the first adhesive surface 10a; printing a graphic image by way of an ink layer 14 on the base layer; assemble a protective layer comprised of a translucent polyvinyl fluoride film layer 20 and a second adhesive layer 18; adding a temporary paper removable liner (not shown); and laminate the protective layer to the top of the base layer with graphic image by using pressure to laminate.

In one embodiment, the base layer selected is to be a conformable product. In another embodiment, the base layer selected is a less conformable product. The conformable product is suitable for covering objects that have a lot of bends and angles and require a pliable multilayer film. The less conformable product is suitable for signs and flat surfaces.

The multilayer film 10 can be wet applied to an object 30. Alternatively, the translucent polyvinyl film layer 20 can be mechanically applied to the ink layer 16 or the translucent polyvinyl film layer can be wet applied to an object such as a stop stop sign.

The multilayer film can be applied virtually any object in need of protection from graffiti, chemicals, weather, water, acids, salt, acid rain, pollution, vandalism, and other deleterious environmental conditions from any source. For example, the multilayer film can be applied to and protect objects such as mass transit vehicles, city objects, traffic and utility cabinets, buses, cars, walls, subways, railings, sidewalks, buildings (both interior and exterior), streets, poles, stairs, hallways, rooms, park buildings, playgrounds and all other objects located in a city or town or virtually anywhere. Thus, it is to be understood that the types of objects to which the multilayer film can be applied in order to protect the objects is virtually limitless.

In another embodiment, a method of applying the multilayer film 10 to the surface 32 of an object 30 includes the steps of: inspecting the object; removing any graffiti, chipped paint, adhesives, or adhesive residue from the object; cleaning the surface 32 for installation; optionally priming all edges of the object 30 including welds and complex curves with a primer; installing multi layered vinyl containing a protective coating; heating surface of the multilayer film 10; sealing all edges with an edge sealer; applying seam tape to any seams on the top of the object. Of note, if the multilayer film 10 is being applied to an object 30 that contains electrical components, a non flammable cleaner is used to clean the surface.

In one embodiment, the primer is 3M® primer 94.

In a preferred embodiment, the ink layer 14 is installed following normal 3M®/PDAA/USAG guidelines and additional guidelines to ensure proper installation. These guidelines are well known to those of ordinary skill in the art and thus will not be further described. In particular, all horizontal seams are faced downward to reduce open exposure during installation. Vertical seams, if any, face away from streets or away from potential environmental hazards such as lawn irrigation sprinklers. Preferably, at least 1" of multilayer film 10 is adhered to a flat surface before and after a complex curve, weld or hinge.

In another embodiment, a method of pretreating overlapping seam areas includes the steps of: applying the first portion of the multilayer film 10 and using a propane blow torch with a flame to treat the surface 32 that will have to accept the overlapping material. A primer may also be used to treat the top surface 20b of the multilayer film 10.

Preferably, a 1" width should be treated with a fast exposure to the tip of the flame moving horizontally, diagonally or vertically at a rate of approximately 0.25-1 sec exposure per 2 square inches of material. This step will treat the material and make it adhesive accepting.

In another embodiment, a method of pretreating overlapping seam areas includes the steps of: applying the first portion of the multilayer film 10 and using 3M® primer 94 to treat the surface that will have to accept the overlapping material.

Because the multilayer film 10 of the instant disclosure has anti-adhesive qualities, any overlapping seams require special treatment so that the portion that overlaps another portion of the multilayer film 10 is no longer anti-adhesive and can thusly accept a portion of multilayer film 10. Preferably, a 1" width should be treated, thereby making the material adhesive accepting.

In another preferred embodiment, the multilayer film 10 is treated to set the film. The multilayer film is treated by heating it to a temperature between 250° F. and 330° F. degrees and for a time sufficient to conform around and protect any complex bends, welds, or curves of the object 30, the multilayer film 10 will be heated for a longer time. In one example, the temperature selected was 300° F. degrees. In a preferred embodiment, the surface of the multilayer film 10 is heat treated with a non-direct flame heat source, preferably, with a heating gun or a torch with a flame diffuser. It is important to ensure that an open flame does not make contact with the visible areas of the multilayer film 10 since it will change the structure of the film to accept adhesives.

In another preferred embodiment, the edge sealer is 3M® 3950 Edge Sealer and the seam tape is made from poly vinyl fluoride. In some cases, it is preferable to apply edge tape on all seams.

In a preferred embodiment, the objects 30 suitable for film application include utility boxes, garbage cans, garbage dumpsters, parking meters, light poles, utility poles, electric boxes, control boxes, phone boxes, air conditioner units, walls, pay stations, railroad controller boxes, signs, traffic cabinets, traffic boxes, utility cabinets, sanitation vehicles, sanitation equipment, and sanitation containers, trash cans, trash dumpsters, mass transit, public transportation vehicles, public areas, interior and exterior wall surfaces and any other object that is in need of beautification.

In another embodiment, a method of installing a multilayer film 10 on an object 30 includes the steps of: manufacturing a multilayer film 10 and installing the multilayer film on an object 30.

In a preferred embodiment, the multilayer film 10 includes an ink layer 16 and a laminate/over-laminate (not shown), with claims of easy graffiti removal. Preferably, the multilayer film 10 has anti-graffiti and adhesive removal qualities and is capable of being installed onto complex curved surfaces 32 or objects 30. Moreover, the multilayer film 10 is capable of withstanding multiple cleanings using natural or organic and non-organic based chemicals.

In another preferred embodiment, the multilayer film 10 is used for beautification of city objects 30. Alternatively, the multilayer film 10 may contain advertising and may be installed onto city and privately owned objects.

In another preferred embodiment, the method provides a multilayer film 10 having the following properties: anti-graffiti, acid etching resistant, chemical resistance to natural, organic, and inorganic cleaners, is capable of being installed onto simple and complex curves, and has adhesive resistance, wherein the multilayer film 10 withstands impairments for at least three years.

Benefits of the present disclosure include the ability of the multilayer film 10 to transform defaced public utility objects 30 and other structures into more aesthetically appealing objects. Moreover, because the multilayer film 10 is capable of withstanding common impairments and fading, maintenance and renewal costs are reduced.

It will be appreciated by those skilled in the art that while the multilayer film has been described in detail herein, the invention is not necessarily so limited and other examples, embodiments, uses, modifications, and departures from the embodiments, examples, uses, and modifications may be made without departing from the process and all such embodiments are intended to be within the scope and spirit of the appended claims.

What is claimed is:

1. A multilayer film for extending a lifetime of printed indicia, the multilayer film comprising:
    (a) a first adhesive layer having opposed first and second adhesive layer surfaces;
    (b) a flexible printable vinyl layer having opposed first and second printable vinyl layer surfaces, wherein the first flexible printable vinyl surface abuts and is adhered to the second adhesive layer surface;
    (c) an ink layer having opposed first and second ink layer surfaces, wherein the first ink layer surface abuts and is supported by the second flexible printable vinyl layer surface;
    (d) a second adhesive layer having opposed first and second adhesive layer surfaces, wherein the first adhesive layer surface of the second adhesive layer abuts and is disposed on the second ink layer surface;
    (e) a translucent polyvinyl fluoride film layer having opposed first and second translucent polyvinyl fluoride film layer sides, wherein the first translucent polyvinyl fluoride film layer side abuts and is adhered to the second adhesive layer surface of the second adhesive layer; and
    (f) wherein at least one overlapping seam of the second translucent polyvinyl film layer side is treated such that the at least one overlapping seam is adhesive accepting.

2. The multilayer film of claim 1, wherein the first adhesive layer surface of the first adhesive layer is capable of being adhered to an object such that printed indicia can be displayed on an object.

3. The multilayer film of claim 1, wherein the first adhesive layer is optically clear, semi-permanent, is acrylic-based, and is pressure-sensitive.

4. The multilayer film of claim 1, wherein the second adhesive layer is optically clear, acrylic based, permanent, and pressure-sensitive.

5. The multilayer film of claim 1, wherein the second adhesive layer is optically clear, permanent, and heat-activated.

6. The multilayer film of claim 1, wherein the at least one overlapping seam of the second translucent polyvinyl film layer side has a one inch width.

7. The multilayer film of claim 6, wherein the translucent polyvinyl fluoride film layer is treated with a propane flame.

8. A multilayer film for extending a lifetime of printed indicia, the multilayer film comprising:
    (a) a first adhesive layer having opposed first and second adhesive layer surfaces;
    (b) a flexible printable vinyl layer having opposed first and second printable vinyl layer surfaces, wherein the first flexible printable vinyl surface abuts and is adhered to the second adhesive layer surface;
    (c) an ink layer having opposed first and second ink layer surfaces, wherein the first ink layer surface abuts and is supported by the second flexible printable vinyl layer surface;
    (d) a second adhesive layer having opposed first and second adhesive layer surfaces, wherein the first adhesive layer surface of the second adhesive layer abuts and is disposed on the second ink layer surface;
    (e) a translucent film layer having opposed first and second translucent film layer sides, wherein the first translucent film layer side abuts and is disposed on the second adhesive layer surface of the second adhesive layer;
    (f) wherein at least one overlapping seam of the second translucent film layer side is treated such that the at least one overlapping seam is adhesive accepting.

9. The multilayer film of claim 8, wherein the translucent film layer is selected from the group consisting of: a polyester film layer, an extruded polyester film layer, a polychlorotrifluoroethylene film layer, a fluoride resin film layer, a fluoropolymer film layer, and a polyvinyl fluoride film layer.

10. The multilayer film of claim 9, wherein the multilayer film has anti-graffiti properties.

11. The multilayer film of claim 9, wherein the multilayer film has chemical resistant properties.

12. The multilayer film of claim 9, wherein the multilayer film has adhesive-resistant properties.

13. The multilayer film of claim 9, wherein the multilayer film is conformable.

14. A method of protecting a surface of an object comprising the steps of:

provinding a multilayer film having anti-graffiti and chemical resistant properties, wherein the multilayer film is comprised of at least five separate layers and is formed by:

(a) providing a first adhesive layer having opposed first and second first adhesive layer surfaces;

(b) providing a flexible printable vinyl layer having opposed first and second printable vinyl layer surfaces, and adhering the first flexible printable vinyl surface to the second adhesive layer surface of the first adhesive layer;

(c) providing an ink layer having opposed first and second ink layer surfaces, and disposing the the first ink layer surface the on second flexible printable vinyl layer surface;

(d) providing a second adhesive layer having opposed first and second adhesive layer surfaces, and adhering the first adhesive layer surface of the second adhesive layer to the second ink layer surface;

(e) providing a translucent film layer having opposed first and second translucent film layer sides, and adhering the first translucent film layer side the second adhesive layer surface of the second adhesive layer, wherein the translucent film layer is selected from the group consisting of a polyester film layer, an extruded polyester film layer, a polychlorotrifluoroethylene film layer, a fluoride resin film layer, a fluoropolymer film layer, and a polyvinyl fluoride film layer;

(f) providing at least one overlapping seam of the second translucent film layer that is treated such that the at least one overlapping seam is adhesive accepting; and (g) adhering the first adhesive layer surface of the first adhesive layer to the surface of the object to be protected such that the surface of the object is protected.

15. The method of claim 14, wherein the multilayer film also has adhesive resistant properties.

16. The method of claim 14, wherein the multilayer film also has extreme weather resistant properties.

17. The method of claim 14, wherein the multilayer film also has acid etching resistant and salt resistant properties.

18. The method of claim 14, wherein the multilayer film also has ultraviolet radiation resistant properties.

19. The method of claim 14, wherein the multilayer film also has non-interfering properties.

20. The method of claim 14, wherein the multilayer film also has conformable properties.

* * * * *